(12) United States Patent
Scremin et al.

(10) Patent No.: US 10,292,334 B2
(45) Date of Patent: May 21, 2019

(54) DUMP UNIT

(71) Applicant: BRITISH AMERICAN TOBACCO (INVESTMENTS) LIMITED, London (GB)

(72) Inventors: Jeronimo Scremin, Rio de Janeiro (BR); Alex Rodrigo Villa, Rio de Janeiro (BR); Vando Braz De Oliveira, Rio de Janeiro (BR)

(73) Assignee: British American Tobacco (Investments) Limited, London (GB)

( * ) Notice: Subject to any disclaimer, the term of this patent is extended or adjusted under 35 U.S.C. 154(b) by 0 days.

(21) Appl. No.: 15/532,522

(22) PCT Filed: Dec. 3, 2015

(86) PCT No.: PCT/GB2015/053696
§ 371 (c)(1),
(2) Date: Jun. 2, 2017

(87) PCT Pub. No.: WO2016/087860
PCT Pub. Date: Jun. 9, 2016

(65) Prior Publication Data
US 2018/0014465 A1 Jan. 18, 2018

(30) Foreign Application Priority Data
Dec. 5, 2014 (BR) .................... BR2020140305586

(51) Int. Cl.
*B60P 1/04* (2006.01)
*B60P 1/38* (2006.01)
(Continued)

(52) U.S. Cl.
CPC ............... *A01D 90/10* (2013.01); *B60P 1/04* (2013.01); *B60P 1/16* (2013.01); *B60P 1/38* (2013.01);
(Continued)

(58) Field of Classification Search
CPC ..................................... B60P 1/16; B60P 1/38
See application file for complete search history.

(56) References Cited

U.S. PATENT DOCUMENTS 3,107,798 A * 10/1963 Overgard .................. B60P 1/16
198/316.1
3,520,434 A * 7/1970 Destefan ................ A01D 90/10
414/502
(Continued)

FOREIGN PATENT DOCUMENTS

BE 1004870 A6 2/1993
BR PI0506387 A 7/2007
(Continued)

OTHER PUBLICATIONS

International Searching Authority, "The International Search Report and The Written Opinion of the International Searching Authority, or the Declaration", issued in connection with International Patent Application No. PCT/GB2015/053696, dated Aug. 9, 2016, 11 pages.
(Continued)

*Primary Examiner* — Jonathan Snelting
(74) *Attorney, Agent, or Firm* — McKee, Voorhees & Sease, PLC

(57) ABSTRACT

A dump unit comprises a main chassis (2); a metallic body (3) for containing a bulk material, wherein the bulk material can be discharged from one end of the metallic body; a hydraulic actuator (8) for lifting the discharge end of the metallic body with respect to the chassis; and at least one metallic conveyor (E) located on the floor of the body (3), which is operable to discharge the bulk material from the body.

11 Claims, 2 Drawing Sheets

(51) Int. Cl.
*A01D 90/10* (2006.01)
*B60P 1/16* (2006.01)
*B60P 3/00* (2006.01)
*B62D 33/027* (2006.01)
*E05F 1/00* (2006.01)

(52) U.S. Cl.
CPC ............ *B60P 3/00* (2013.01); *B62D 33/0276* (2013.01); *E05F 1/00* (2013.01); *E05Y 2900/516* (2013.01)

(56) References Cited

U.S. PATENT DOCUMENTS

| | | | | |
|---|---|---|---|---|
| 3,811,602 | A | * | 5/1974 | Holland ............ B60P 1/38 222/415 |
| 3,866,770 | A | * | 2/1975 | Palmer ............ B60P 1/38 198/550.13 |
| 5,902,090 | A | * | 5/1999 | Young ............ B60P 1/38 198/570 |
| 6,702,542 | B1 | * | 3/2004 | Chance ............ B60P 1/02 414/347 |

FOREIGN PATENT DOCUMENTS

| | | |
|---|---|---|
| DE | 2156231 A1 | 5/1973 |
| DE | 2230473 A1 | 1/1974 |
| DE | 102004022874 A1 | 12/2005 |
| FR | 1570213 | 6/1969 |
| GB | 1234048 A | 6/1968 |
| GB | 2159790 A | 12/1985 |
| NL | 7215270 A | 5/1793 |
| NL | 6708679 A | 12/1968 |

OTHER PUBLICATIONS

International Preliminary Examining Authority, "Written Opinion of the International Preliminary Examining Authority", issued in connection with International Patent Application No. PCT/GB2015/053696, dated Apr. 18, 2017, 7 pages.

* cited by examiner

DUMP UNIT

CROSS-REFERENCE TO RELATED APPLICATIONS

This application is the National Stage of International Application No. PCT/GB2015/053696, Dec. 3, 2015, which claims priority to and benefit of Brazilian Patent Application No. BR2020140305586, filed Dec. 5, 2014, all of which are herein incorporated by reference in their entirety for all purposes.

The present application relates to apparatus for use in the mechanical harvesting of tobacco and other similar crops.

The harvesting of the tobacco crop is accomplished by harvesting the mature leaves. Maturation begins in the lower leaves of the plant and follows to the upper leaves, that is, from the base to the top of the plant. When the ideal state of maturation is reached, the mature leaves should then be harvested to ensure product quality.

After the detachment of the mature leaves from their plants, they are transported to a curing unit where they are cured. This entire process of harvesting, transportation and curing must be accomplished without causing physical damage to the harvested leaves, thus ensuring their integrity, since the quality, and hence, the value of the product, is related to the physical aspect and/or appearance of the tobacco leaf after curing.

In Brazil, this process of harvesting and transportation is traditionally, and still largely, performed manually in Brazil. However, in order to reduce ergonomic problems and increase productivity, mechanical harvesters are being introduced into this agriculture process.

However, with the mechanization of the harvest, it has become of paramount importance to maintain the operational flow of harvesting-unloading-curing. Thus, it is necessary to maintain the flow of mechanically harvested tobacco for the next stage of the process, namely, transport to the leaf curing system.

Currently, in the mechanized harvesting system, the harvested tobacco leaves are discharged by the harvester into a truck with a dump unit or trailer which transports the leaves to the box filling location, where they are packed in metal boxes which accommodate the curing process. Curing is done in greenhouses, or curing units, with a heating and ventilation system.

The process of the packing of tobacco leaves in metal boxes must be performed with optimal and uniform density for the curing process to occur properly and evenly. This packing can be performed manually or with the aid of special equipment, however, in both cases, the tobacco leaves need to be manually unloaded from the dump unit, requiring the use of manpower.

Therefore, the combination of mechanical harvesting and existing conventional dump unit truck, presents as a problem, the need to use several dump unit trucks for the transportation and unloading of tobacco leaves for maintaining the flow of mechanical harvesting without interruption.

Another problem in the use of conventional dump unit models, such as documented in BR PI0506387, which uses a tipper box, is that these models are typically suited to the transporting and unloading of products with a low coefficient of friction—which is not characteristic of a tobacco crop. Moreover, a conventional tipping system enables product unloading at ground level, which in the case of its use for the dumping of tobacco leaves into curing boxes, would then require the use of other equipment provided with a lifting system after the unloading from the conventional dump unit, to lift the tobacco leaves in order to pack them in the aforementioned boxes, uniformly, and with ideal density for the curing process.

As described herein, a dump unit is provided for the mechanized harvesting of tobacco leaves, with an elevated rear and a mobile metal conveyor system in the bed of the truck where loading occurs. The dump unit comprises:

i. a main chassis (2), preferably assembled with metal profiles, where there are grouped at least two pairs of wheels (4), preferably with a simple wheelset;

ii. a body (3), preferably in metal with a substantially rectangular shape, more preferably of the grain type, with a hydraulic actuator for movement and articulation (8), further comprising a door (9) in the rearward position with a hinged opening and closing movement, activated by linear actuators (7);

iii. at least one metallic conveyor belt (E), preferably driven by a hydraulic motor (5) positioned on the bed of the body (3);

iv. at least one support system with height adjustment (6).

This approach described herein relates to an apparatus for transporting and unloading mechanically harvested tobacco leaves. The apparatus helps to provide a reduction in operation time, and also helps to ensure the integrity of the transported product, as well as the safety of this activity.

Such an apparatus may be implemented, for example, by a dump unit—e.g. a form of vehicle or tractor trailer or barrow which supports the transportation and discharge of its contents. The dump unit includes a conveyor belt for performing a discharge from the dump unit, in particular where the discharge occurs at an elevated level (rather than ground level).

Various embodiments will now be described by way of example only with reference to the following drawings.

Figure 1:
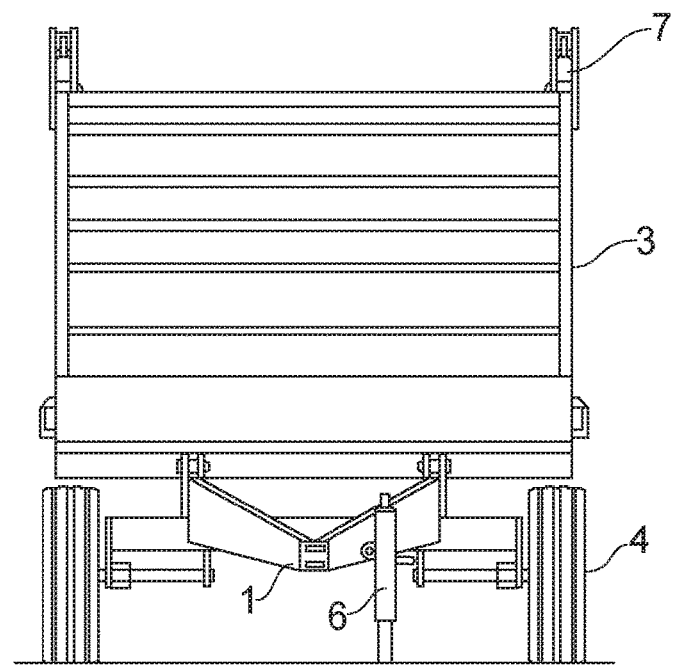
FIG. 1 illustrates the front view of the dump unit with elevated discharge and unloading conveyor.
Figure 2:
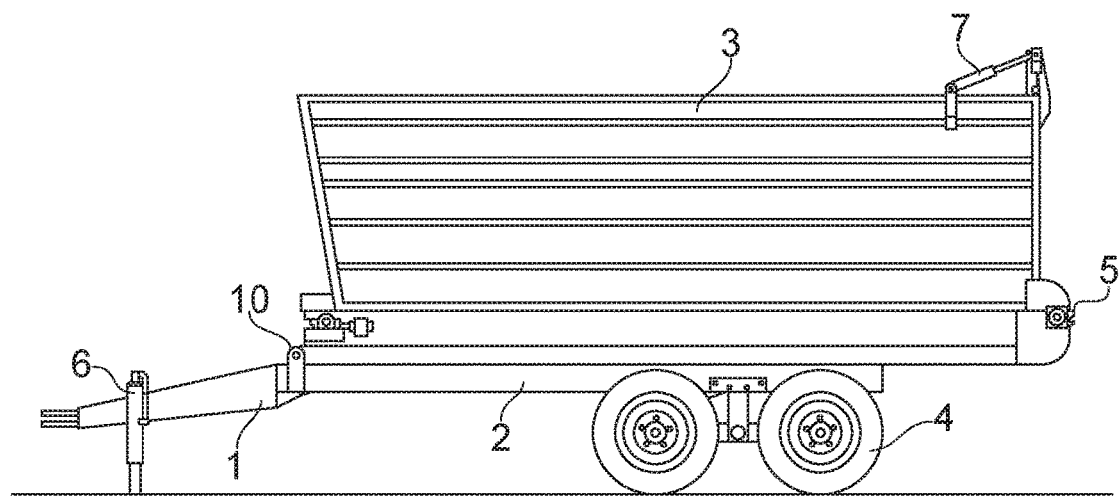
FIG. 2 shows the side view of the dump unit.
Figure 3:
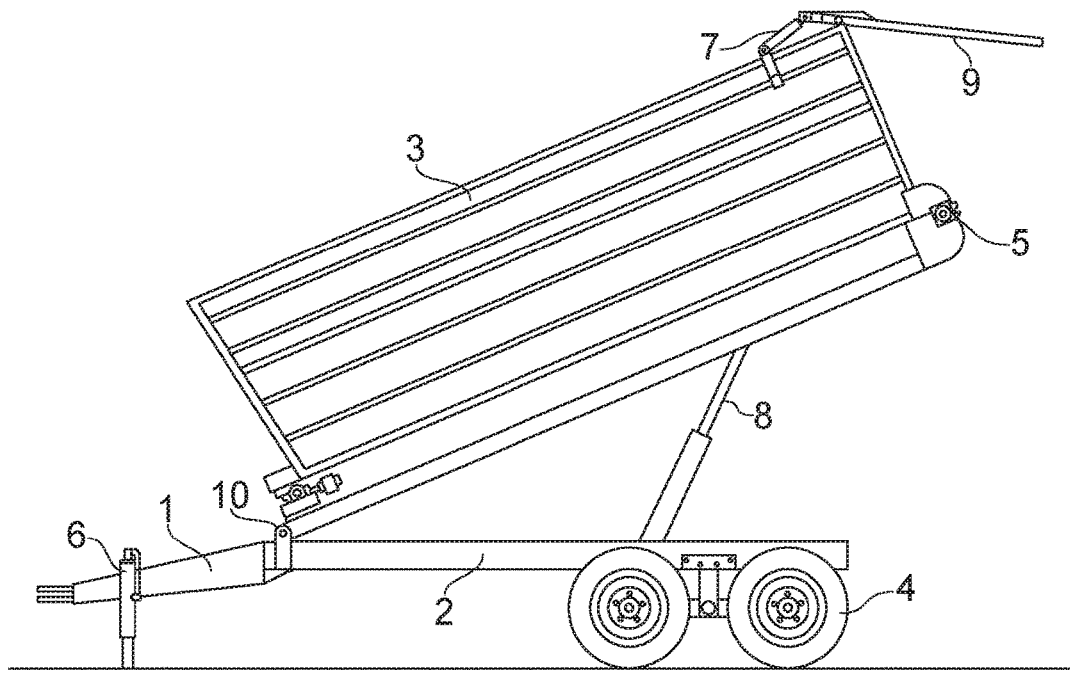
FIG. 3 shows the dump unit with the body (3) in the raised position to perform the unloading of tobacco leaves.

A dump unit with an elevated discharge conveyor, such as described herein, comprises two main structures, as shown in FIGS. 1, 2 and 3. Firstly, there is a main chassis (2) on which are grouped at least two pairs of wheels (4). The chassis has a suitable coupling (1) to engage with a tractor or other haulage vehicle. Secondly, the dump unit includes a metallic body (3), preferably having a body of the type suitable for transporting bulk material. The body (3) is connected to the chassis (2) by an shaft (10) having a hydraulic actuator with articulated movement (8) positioned under the dump unit. The dump unit further has at least one support system (6), preferably having height adjustment, which ensures the stability of the dump unit when it is uncoupled from a tractor unit (1).

Also as shown in FIGS. 1, 2 and 3, the body (3) or container is preferably composed of a metallic structure which is substantially rectangular shape, and comprising a door in the rearward position (9) (i.e. at the opposite end to coupling (1)). The door (9) preferably has an opening and closing movement of the rocker type, in which the door (9) rotates between open and closed positions about a horizontal axis close to the top of the door, wherein the horizontal axis is from side to side (perpendicular to the length direction of the dump unit, from the coupling (1) back to the door (9)). The door may be operated by linear actuators (7).

Figure 4:
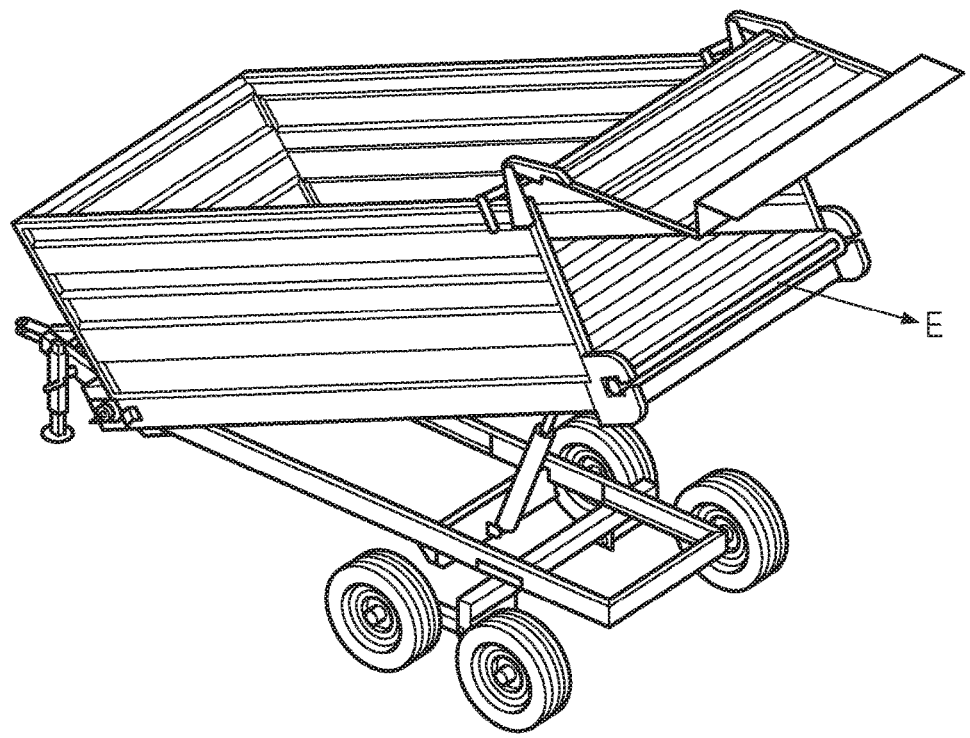
FIG. 4 illustrates the dump unit with the elevated body (3), the overhead door (9) in the open position, revealing the unloading conveyor (E).

The dump unit is further provided with at least one metallic conveyor (E) (see FIG. 4). The conveyor (E) is positioned on the bed or floor of the body (3) and is driven by a hydraulic motor (5) which confers movement for unloading.

FIGS. 3 and 4 show the lift afforded by the hydraulic actuator (8) to the rear of the body (3), which when extended raises the body (3) into an inclined position, sloping down towards the front of the dump unit. In particular, as the actuator (8) extends, the body (3) rotates about the articulated axis (10) positioned at the front end of the body (3) (adjacent the coupling (1)). This provides for the gradual discharge of harvested tobacco leaves by the metal conveyor (E) via door (9) at an elevated height.

Therefore, the dump unit combines multiple systems for unloading, in particular the lifting mechanism at the rear of the body (3), and the provision of a conveyor (E) on the bed of body (3). In addition there is a facility (7) to open the door (9) at the back of the body. The dump unit therefore has an increased capacity for performing unloading in any desired position or inclination. At the same time, the unloading can be conducted intermittently or gradually, by adjusting the speed of the conveyor (E), and thus obtaining a smooth unloading while guaranteeing the integrity of the unloaded product.

In a preferred embodiment, the dump unit enables smooth and homogeneous unloading of tobacco leaves with an operating speed of the conveyor (E) ranging between 0.04 and 1.4 m/s. More preferably the operating speed of the conveyor (E) is between 0.04 m/s and 0.08 m/s. The conveyor (E) is raised to a working height ranging between 800 mm (horizontal position on the chassis (2)) to 2,600 mm (fully tilted position). This lifting height of 1,800 mm is enough to generally avoid the need to use any additional lifting device, thereby allowing the harvested tobacco leaves to be directly discharged from the dump unit into curing boxes.

Thus, the dump unit described herein provides flexibility for the unloading of harvested tobacco leaves in continuous fashion and, in addition, enables the transportation and discharge of tobacco leaves to be made concurrently with the harvest, without interruption of the latter.

The rearward lift system also permits variation in the height of unloading in relation to the ground, which therefore allows the direct discharge of tobacco into metal boxes, corresponding to the control of the flow of unloading. Thus, it is possible to accommodate uniform tobacco leaf shape, with optimal density, while maintaining the integrity of the unloaded tobacco leaves and ensuring product quality.

The approach described herein also has the advantage of eliminating the use of additional lifting equipment for the tobacco leaves, because unloading may be performed directly into metal boxes in which the leaves are cured.

While certain embodiments have been described, they are only shown in an exemplary way, without intention to limit the scope of protection. In fact, the new embodiments described herein may be implemented in a variety of other forms and, furthermore, various omissions, substitutions and changes in the form of the embodiments described herein may be made without departing from the utility model.

The invention claimed is:

1. A dump unit for use in mechanical harvesting of tobacco comprising:
   a main chassis;
   a coupling at a forward end of the chassis;
   a door at a rearward end of the chassis, the door having an open position and a closed position;
   a metallic body for containing a bulk material comprising tobacco leaves, the metallic body having a floor and side walls, wherein the bulk material can be discharged from one end of the metallic body;
   a hydraulic actuator attached between the chassis and the floor of the metallic body for lifting the discharge end of the metallic body with respect to the chassis;
   at least one metallic conveyor comprising a metallic conveyor belt located on the floor of the body, which is operable to discharge the bulk material from the body, wherein the metallic conveyor belt has an adjustable operating speed which is between 0.04 and 1.4 m/s; and
   a hydraulic motor for driving the conveyer.

2. The dump unit of claim 1, wherein the chassis has at least two pairs of wheels.

3. The dump unit of claim 1, wherein the body is assembled from metal profiles or panels.

4. The dump unit of claim 1, wherein the body has a substantially rectangular shape for holding the bulk material.

5. The dump unit of claim 1, wherein the door is an overhead door through which the bulk material may be discharged from the dump unit and further wherein the door has a rocker type opening and closing movement.

6. The dump unit of claim 5, further comprising linear actuators for opening the door to discharge the bulk material.

7. The dump unit of claim 1, wherein the operating speed of the metallic conveyor belt is between 0.04 and 0.08 m/s.

8. The dump unit of claim 1, wherein a height of the metallic conveyor belt at the discharge end can be varied between 800 mm and 2600 mm.

9. The dump unit according to claim 8, wherein the height of the metallic conveyor belt is substantially 1,800 mm.

10. The dump unit according to claim 9, wherein the body is of a bulk carrier type.

11. The dump unit of claim 1, further comprising at least one support system with height adjustment.

* * * * *